United States Patent [19]

Seki et al.

[11] Patent Number: 5,614,984

[45] Date of Patent: Mar. 25, 1997

[54] DISTANCE MEASURING DEVICE

[75] Inventors: Yoichi Seki; Tomihiko Aoyama; Michio Kawai; Akira Ito, all of Chiba-ken, Japan

[73] Assignee: Seikosha Co., Ltd., Tokyo, Japan

[21] Appl. No.: 505,518

[22] Filed: Apr. 19, 1995

Related U.S. Application Data

[63] Continuation of Ser. No. 104,320, Aug. 9, 1993, abandoned.

[30] Foreign Application Priority Data

Aug. 20, 1992 [JP] Japan ..................... 4-221597

[51] Int. Cl.$^6$ .................................. G03B 13/36
[52] U.S. Cl. ...................... 396/106; 250/206.1
[58] Field of Search ............. 354/403; 356/3.02; 250/201.4, 206.1

[56] References Cited

U.S. PATENT DOCUMENTS

| | | | |
|---|---|---|---|
| 4,274,735 | 6/1981 | Tamura et al. | 356/1 |
| 4,615,616 | 10/1986 | Shiomi | 354/402 |
| 4,629,882 | 12/1986 | Matsuda et al. | 250/214 R |
| 4,764,786 | 8/1988 | Tamura et al. | 354/403 |
| 4,849,781 | 7/1989 | Nakazawa et al. | 354/403 |
| 5,138,146 | 8/1992 | Idesawa | 250/206.1 |
| 5,184,168 | 2/1993 | Nonaka | |
| 5,229,806 | 7/1993 | Takehana | 354/403 |
| 5,235,377 | 8/1993 | Ide et al. | 354/403 |

Primary Examiner—Russell E. Adams
Attorney, Agent, or Firm—Jordan and Hamburg

[57] ABSTRACT

A distance measuring device for ensuring accuracy of the positional relationship between the optical axis of a light-receiving lens and the optical center of a light-receiving element obtains distance information data by measuring the distance to a target plate which is 1 meter from the distance measuring device. If the distance information is not smaller than 1.625 meter, a switch is connected to one pair of terminals and the difference between reference output data stored in a control circuit and output data of an AF-IC obtained when the distance to the target plate is measured with the switch connected to the pair of terminals is calculated and stored in a memory circuit. When the value of the distance information data is not greater than 0.375 meter, the switch is connected to another pair of terminals, and output deviation data is stored in the memory circuit 11 in the same way. When the value of the distance information value is smaller than 1.625 meter and greater than 0.375 meter, the switch is connected to a further pair of terminals, and output deviation data is stored in the memory circuit in the same way.

12 Claims, 3 Drawing Sheets

DISTANCE MEASURING DEVICE

This application is a continuation, of application Ser. No. 08/104,320 filed Aug. 9, 1993 now abandoned.

FIELD OF THE INVENTION

The present invention relates to a distance measuring device.

BACKGROUND OF THE INVENTION

An active type distance measuring device which determines a distance to a subject by projecting a light beam from the camera side and receiving reflected light from the subject, is generally known. When a PSD (semiconductor position sensor diode) is used as a light-receiving element of an active distance measuring device, it is necessary, in order to obtain the desired distance measuring accuracy, to ensure the required positional relationship between the optical axis of a light-receiving lens and the optical center of the PSD. However, a positioning difference may occur during mounting of the light-receiving lens and the PSD during the process of manufacturing the distance measuring device. In general, each individual light-receiving element is first soldered to a printed board, and then this printed board is attached to a holder of a distance measuring device. Therefore, a positioning difference is likely to occur when each light-receiving element is soldered to the printed board. In addition, since the light-receiving lens is manufactured to be slightly smaller in size than the lens holder in the stage of production so that the light-receiving lens is surely set in the lens holder, when the lens is attached, there may be a difference in the positional relationship between the optical axis 52 of the light-receiving lens 51 and the optical center 54 of the PSD 53, as shown in FIG. 5.

To solve the above-described problem, that is, to align the optical center of the PSD with the optical axis of the light-receiving lens during the manufacturing process, it has been conventional practice to move the PSD to a given position with a mechanical adjusting means or to make the light-receiving region of the PSD longer than is necessary so that the measured distance value cannot be influenced by the difference.

Employment of the mechanical adjusting means as described above, however, causes the device to be larger and more complicated.

An increase in the length of the light-receiving region of the PSD results in a reduction in the change of the ratio of the output signal to the measured distance. Accordingly, it becomes more likely that the output signal will be influenced by noise.

SUMMARY OF THE INVENTION

It is an object of the present invention to ensure the required accuracy of the positional relationship between the optical axis of a light-receiving lens and the optical center of a light-receiving element with a simple construction during the manufacturing process.

In order to attain the above-described object, the present invention provides a distance measuring device having a light-projecting unit for projecting light toward a subject, a light-receiving lens for receiving reflected light from the subject, and a light-receiving element that receives the light received by the light-receiving lens and generates an output corresponding to a distance to the subject. The distance to the subject is thereby detected on the basis of the output from the light-receiving element. The distance measuring device includes means for changing the position of the light-receiving region of the light-receiving element by selecting a pair of terminals from among a plurality of terminals positioned at predetermined intervals in the lengthwise direction of the light-receiving region, so that the optical center of the light-receiving element coincides with the optical axis of the light-receiving lens.

In addition, to attain the above-described object, the light-receiving element is comprised of a PSD.

BRIEF DESCRIPTION OF THE DRAWINGS

In order that the invention may be more clearly understood, it will now be disclosed in greater detail with reference to the accompanying drawings, wherein.

DISCLOSURE OF THE PREFERRED EMBODIMENTS

Figure 1:
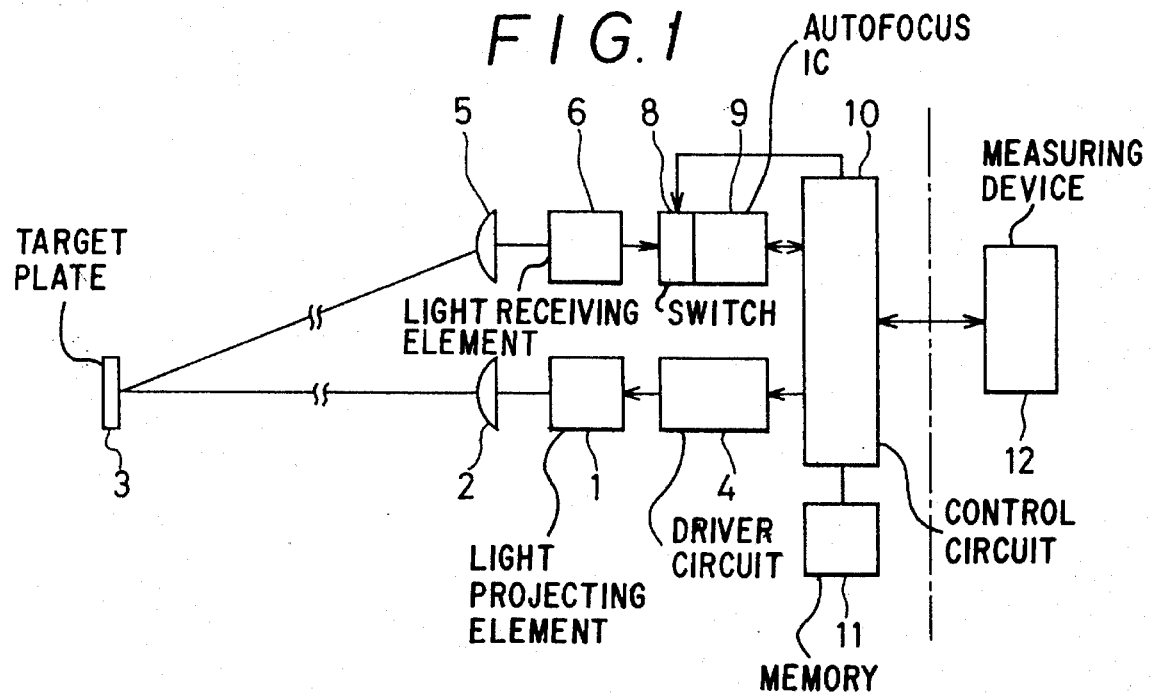
FIG. 1 is a block circuit diagram showing one embodiment of the present invention.

FIG. 1 shows an embodiment of the invention in which the invention is employed as a distance measuring device for a camera.

In the figure, a light-projecting element 1 comprises a light-projecting unit. In this embodiment, a light-projecting element that emits infrared radiation (hereinafter referred to as "IRED") is used as the light-projecting element 1 to project infrared radiation toward a target plate 3 through a light-projecting lens 2.

A driver circuit 4 drives the light-projecting element 1.

Reference numeral 5 denotes a light-receiving lens.

A light receiving element 6, which is a PSD in this embodiment, has a plurality of terminals 7 (see FIG. 2) distributed in the lengthwise direction of a light-receiving region thereof, i.e., in a direction perpendicular to the direction from which the light is received.

A switch 8 is a changeover means and is connected to the terminals 7 on the PSD 6.

An autofocus IC 9 (hereinafter referred to as "AF-IC") generates a distance signal on the basis of the output of the PSD 6.

A control circuit 10 is comprised of a CPU, ROM, RAM, etc., and controls various operations.

A memory circuit 11 is comprised of an EEPROM or the like and stores terminal data.

The light-projecting element 1, the light-projecting lens 2, the driver circuit 4, the light-receiving lens 5, the light-receiving element 6, the terminals 7, the switch 8, the AF-IC 9, the control circuit 10 and the memory circuit 11 are accommodated within the camera body (not shown).

The measuring device 12 is comprised of a CPU, ROM, RAM, etc. The measuring device 12 calculates a distance to the target plate 3 from distance information delivered thereto by the control circuit 10, and controls the changeover operation of the switch 8 on the basis of the result of the calculation.

Figure 2:
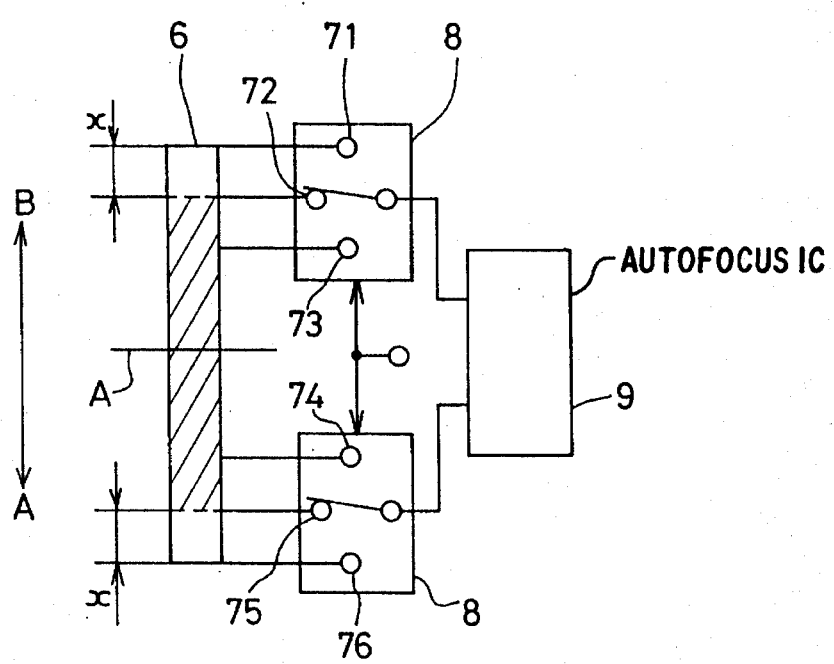
FIG. 2 is an enlarged view of an essential part of the embodiment shown in FIG. 1.

FIG. 2 is a detailed view of the PSD 6 and the switch 8. It should be noted that the PSD 6 is larger than is necessary for conventional distance measurement (about 2.5 mm in this embodiment) for distance measurement, as shown in the Figure. In this embodiment, x=0.3 mm and hence, the overall length of the PSD 6 is about 3.1 mm. The terminals 7 are provided not only at opposite ends (i.e., terminals 71 and 76) in the lengthwise direction of the light-receiving region, but also at intermediate positions between the two lengthwise ends of the light-receiving region as shown by reference numerals 72, 73, 74 and 75. The terminals 72 and 75 are provided at respective positions which are 0.3 mm inward of opposite ends of the light-receiving region, and the terminals 73 and 74 are provided at respective positions which are 0.3 mm inward of the neighboring terminals 72 and 75. In other words, the distance between terminals 71 and 74, that between the terminals 72 and 75 and that between the terminals 73 and 76 are all equal to each other, that is, 2.5 mm. Accordingly, whichever terminal pair, that is, the terminals 71 and 74, or the terminals 72 and 75, or the terminals 73 and 76, is connected to the switch 8, the relationship of the output of the PSD 6 to the measured distance remains constant. Thus, even if the switch 8 is changed over from one position to another, a satisfactory distance measurement result is obtained at all times.

Figure 3:
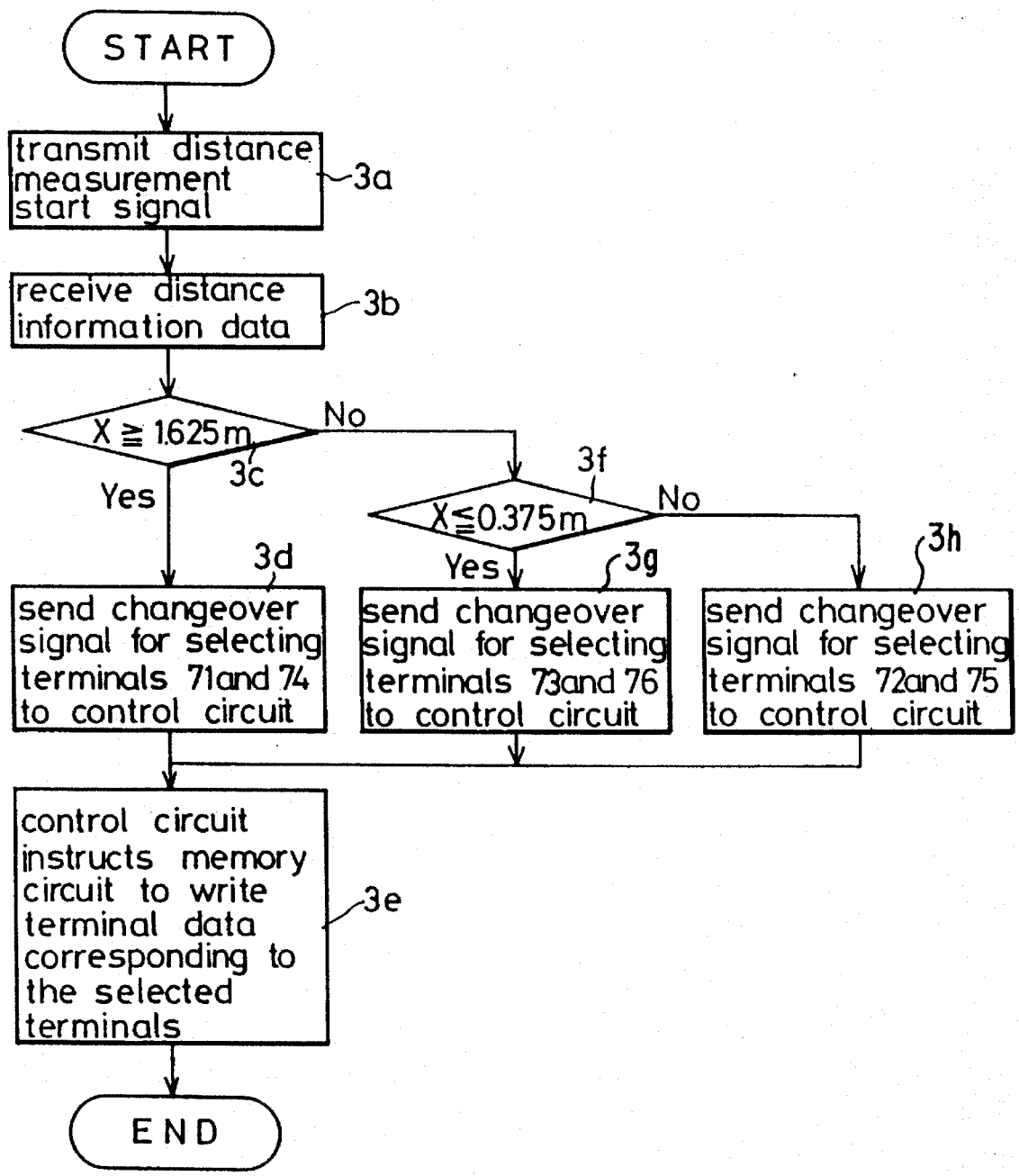
FIG. 3 is a flowchart for explanation of the operation of the embodiment shown in FIG. 1.

The operation will be explained below with reference to FIG. 3.

It is assumed that the target plate 3 is disposed at a position 1 meter from the distance measuring device and the switch 8 is initially connected to the terminals 72 and 75. That is, the light-receiving region of the PSD 6 is defined between the terminals 72 and 75, and in this case the optical center A of the PSD 6 lies at the lengthwise center of the light-receiving region.

When a distance measurement start signal is input to the control circuit 10 from the measuring device 12 in response to an operation of a switch (not shown) or the like, the control circuit 10 activates the driver circuit 4 to project infrared radiation from the light-projecting element 1 toward the target plate 3 through the light-projecting lens 2 (Step 3a).

Infrared radiation reflected from the target plate 3 enters the PSD 6 via the light-receiving lens 5.

Since the switch 8 is now connected to the terminals 72 and 75, the PSD 6 generates a signal current from the terminals 72 and 75.

The AF-IC 9 is fed the signal current via the switch 8 and applies a distance signal corresponding to the signal current to the control circuit 10.

The control circuit 10 generates distance information data on the basis of the distance signal input thereto and outputs the data to the measuring device 12.

When the distance information data is input to the measuring device 12 (Step 3b), it is determined whether or not the value of the distance information data corresponds to 1.65 meters or more (Step 3c).

If the value of the distance information data corresponds to 1.625 meters or more, the measuring device 12 determines that the optical center of the PSD 6 is at least 0.3 mm offset in the direction of the arrow A relative to the optical axis of the light-receiving lens 5, and generates a changeover signal for connecting the switch 8 to the terminals 71 and 74 to the control circuit 10 (Step 3d).

In response to the changeover signal, the control circuit 10 applies a drive signal to the AF-IC 9 so as to connect the switch 8 to the terminals 71 and 74, and then measures the distance to the target plate 3 again. Further, the control circuit 10 instructs the memory circuit 11 to store connected terminal data corresponding to the changeover signal (in this case, terminal 71 data and terminal 74 data) and output deviation data (described later) of the PSD 6, which is arithmetically obtained in the control circuit 10 (Step 3e).

Since the switch 8 is now connected to the terminals 71 and 74, the light-receiving region of the PSD 6 is defined between the terminals 71 and 74. Accordingly, the optical center of the PSD 6 shifts 0.3 mm in the direction of the arrow B. Thus, the deviation of the optical center of the PSD 6 from the optical axis of the light-receiving lens 5 is adjusted.

Even if the above-described adjustment is made, it is not always possible to attain the required alignment between the optical axis of the light-receiving lens 5 and the optical center of the PSD 6, since there are cases where alignment cannot be obtained satisfactorily. For example, assuming that the relationship between the distance d (in meters) to the subject and the output of the AF-IC 9 (i.e., the output characteristics of the PSD 6) obtained when the optical axis of the light-receiving lens 5 and the optical center of the PSD 6 are coincident with each other is such as that shown by the curve 43 in FIG. 4, if there is an error in the alignment between the optical axis of the light-receiving lens 5 and the optical center of the PSD 6, the output characteristic curve of the AF-IC 9 shifts as shown by the curve 41 or 42.

Therefore, in accordance with the invention, the above-described output deviation data is used to compensate for the shift of the output characteristics of the AF-IC 9.

Figure 4:
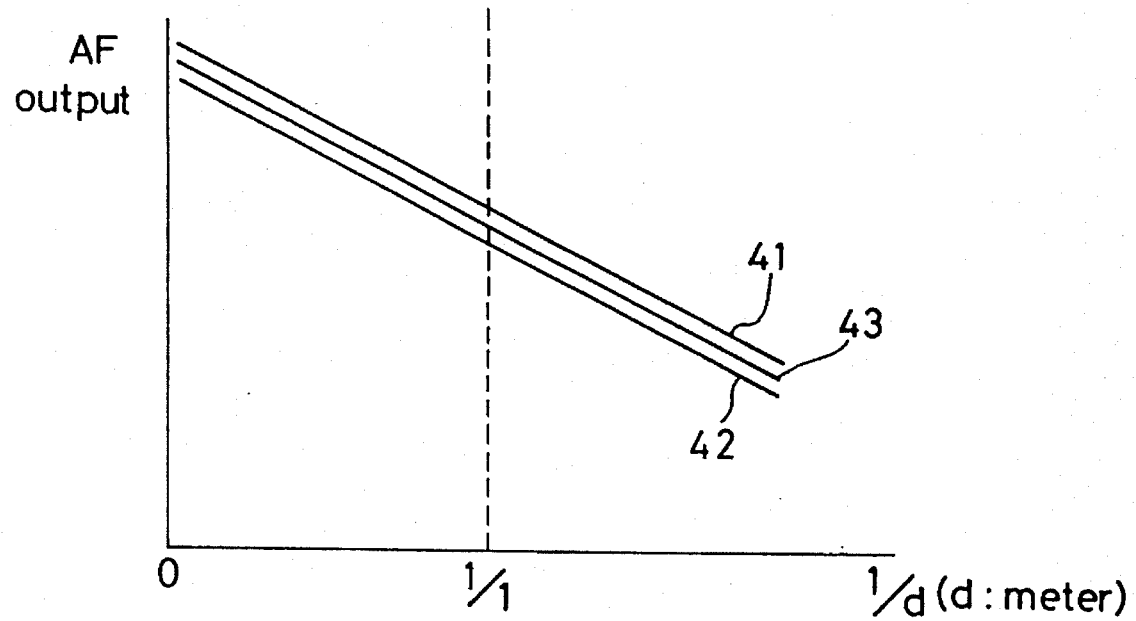
FIG. 4 is a graph showing distance-output characteristics of an AF-IC employed in one embodiment of the present invention.
Figure 5:
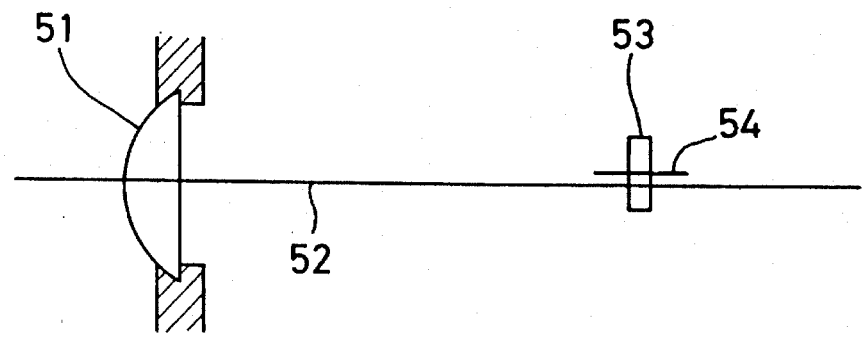
FIG. 5 shows the positional-relationship between the optical axis of a light-receiving lens and the optical center of a PSD in the prior art.

Since there are cases where the optical axis of the light-receiving lens 5 and the optical center of the PSD 6 are not coincident with each other even if the switch 8 is connected to the terminals 71 and 74 in actual practice, the output deviation data is used to make an adjustment such that, as shown in FIG. 4, the output characteristics of the AF-IC 9, that is, the output characteristics of the PSD 6, obtained when the switch 8 is connected to the terminals 71 and 74 (e.g., the curve 41 or 42 in FIG. 4) coincide with the output characteristics of the PSD 6, obtained when the optical axis of the light-receiving lens 5 and the optical center of the PSD 6 are coincident with each other (curve 43 in the Figure).

Output deviation data is calculated by the following method. The distance to the target plate 3 disposed at a position 1 meter from the distance measuring device is measured in advance using the PSD 6 set so that the optical center is coincident with the optical axis of the light-receiving lens 5 and the length of the light-receiving region is equal to the distance between the terminals 71 and 74, and output data of the AF-IC 9 obtained during the distance measurement is stored in the ROM in the control circuit 10 as reference output data. Output deviation data is obtained by calculating the difference between the reference output data and output data of the AF-IC 9 obtained when the distance to the target plate 3 disposed at a position 1 m from the distance measuring device is actually measured with the switch 8 connected to the terminals 71 and 74.

The output characteristics (the curve 43 in FIG. 4) of the reference output data of the PSD 6, stored in the ROM in the control circuit 10, are equal to the actual output characteristics of the PSD 6 (the curves 41 and 42 in FIG. 4) in terms of the ratio of the output to the change in distance (i.e., the slope of the curves 41, 42 and 43 in FIG. 4) because the length of the light-receiving region of the PSD 6 is equal to the distance between the terminals 71 and 74. Accordingly, if the actual distance data is adjusted by the output deviation data, the adjusted distance data shows the same output characteristics as those shown by the curve 43 in FIG. 4. Thus, it is possible to obtain an accurate distance measurement result.

If the value of the distance information data is determined to correspond to 1.625 meter or less in the operation at Step 3c, the measuring device 12 then determines whether or not the value of the distance information data corresponds to 0.375 meter or less (Step 3F).

If the value of the distance information data corresponds to 0.375 meter or less, the measuring device 12 determines that the optical center of the PSD 6 is at least 0.3 mm offset in the direction of the arrow B relative to the optical axis of the light-receiving lens 5, and applies a changeover signal to the switch 8 to connect the terminals 73 and 76 to the control circuit 10 (Step 3g).

In response to the changeover signal, the control circuit 10 applies a drive signal to the AF-IC 9 so as to connect the switch 8 to the terminals 73 and 76, and then measures the distance to the target plate 3 again. Further, the control circuit 10 instructs the memory circuit 11 to store connected terminal data corresponding to the changeover signal (in this case, terminal 73 data and terminal 76 data) and output deviation data of the PSD 6 arithmetically obtained in the control circuit 10 in the same way as discussed above (Step 3e).

Since the switch 8 is now connected to the terminals 73 and 76, the light-receiving region of the PSD 6 is defined between the terminals 73 and 76. Accordingly, the optical center of the PSD 6 shifts 0.3 mm in the direction of the arrow A. Thus, the deviation of the optical center of the PSD 6 from the optical axis of the light-receiving lens 5 is adjusted.

The output deviation data is obtained by calculating the difference between the reference output data stored in the control circuit 10 and output data of the AF-IC 9 obtained when the distance to the target plate 3 disposed at a position 1 meter from the distance measuring device is actually measured with the switch 8 connected to the terminals 73 and 76 in the same way as discussed above. In this case also, since the actual distance data is adjusted by the output deviation data, the adjusted distance data shows the same output characteristics as those shown by the curve 43 in FIG. 4 in the same way as above. Thus, it is possible to obtain an accurate distance measurement result.

If the value of the distance information data is determined to correspond to more than 0.375 meter in the operation at Step 3f, the measuring device determines that the optical center of the PSD 6 is substantially coincident with the optical axis of the light-receiving lens 5 because the value of the distance information data corresponds to more than 0.375 meter and less than 1.625 meter, and generates a changeover signal for connecting the switch 8 to the terminals 72 and 75 by means of the control circuit 10 (Step 3h).

In response to the changeover signal, the control circuit 10 applies a drive signal to the AF-IC 9 so as to connect the switch 8 to the terminals 72 and 75, and then measures the distance to the target plate 3 again. Further, the control circuit 10 instructs the memory circuit 11 to store connected terminal data corresponding to the changeover signal (in this case, terminal 72 data and terminal 75 data) and output deviation data of the PSD 6 arithmetically obtained in the control circuit 10 in the same way as above (Step 3e).

The output deviation data is obtained by calculating the difference between the reference output data stored in the control circuit 10 and output data of the AF-IC 9 obtained when the distance to the target plate 3 disposed at a position 1 meter from the distance measuring device is actually measured with the switch 8 connected to the terminals 72 and 75 in the same way as above. In this case also, since the actual distance data is adjusted by the output deviation data, the adjusted distance data shows the same output characteristics as those shown by curve 43 in FIG. 4 in the same way as above. Thus, it is possible to obtain an accurate result of distance measurement.

Although in the present invention the distance from the distance measuring device to the target plate 3 is 1 meter and the difference in alignment between the optical axis of the light-receiving lens 5 and the optical center of the PSD 6 is measured in accordance with the result of measurement of the distance to the target plate 3, the distance from the distance measuring device to the target plate 3 may be changed appropriately. In this case, it is preferable to change the reference distances (1.625 meter and 0.375 meter in the described embodiment) used as references for changing over the switch 8 in accordance with the distance from the distance measuring device to the target plate 3.

Although in the described embodiment the distances used as references for changing the position of the light-receiving region of the PSD 6 are 1.625 meter and 0.375 meter, these reference values may be changed appropriately in accordance with the focal length of the light-receiving lens 5 and the value of the base length.

Although in the foregoing embodiment the number of terminals provided on the PSD 6 is 6, that is, 3 in terms of the number of terminal pairs, it is not necessarily limited to this number. As the number of terminal pairs increases, it becomes possible to adjust even more finely the difference in alignment between the optical axis of the light-receiving lens 5 and the optical center of the PSD 6.

Further, although in the above-described embodiment the distance measuring device has only one light-projecting element, the present invention may also be applied to a distance measuring device having a plurality of light-projecting elements.

Although in the foregoing embodiment the switch 8 is changed over by a circuit operation when a changeover signal is output from the measuring device 12, the construction may be such that the contents of the changeover signal are displayed on a display unit (not shown) and the switch 8 is changed over by a manual operation in accordance with the changeover signal. In this case, it is preferable to calculate output deviation data after the switch 8 has been changed over by a manual operation.

The system may also be arranged such that every time a distance measuring operation is actually carried out, the connected terminal data stored in the memory circuit 11 is read out, and the switch 8 is connected to a pair of terminals selected from among a plurality of terminals 7 provided on the PSD 6 on the basis of the readout connected terminal data.

According to the present invention, in order to adjust a difference in alignment between the optical axis of the light-receiving lens and the optical center of the light-receiving element, a pair of terminals are selected from among a plurality of terminals provided at desired intervals in the lengthwise direction of the light-receiving region of the light-receiving element, thereby changing the position of the light-receiving region of the light-receiving element. Accordingly, it is possible to ensure the required accuracy of the positional relationship between the optical axis of the light-receiving lens and the optical center of the light-receiving element with a simple arrangement during the manufacturing process and, hence, it is possible to make an accurate distance measurement.

If the light-receiving element is a PSD, it is possible to ensure the required accuracy of the positional relationship between the optical axis of the light-receiving lens and the optical center of the light-receiving element with a simpler arrangement during the manufacturing process and it is, hence, possible to make an accurate distance measurement.

Although the present invention has been fully described by way of example with reference to the accompanying drawings, it is to be understood that various changes and modifications will be apparent to those skilled in the art. Therefore, unless such changes or modifications depart from the scope of the invention, they should be construed as being included therein.

What we claim is:

1. A distance-measuring device comprising:
   a light-projecting unit for projecting light toward a subject,
   a light-receiving lens for receiving reflected light from said subject,
   a light-receiving element positioned to receive the reflected light from the light-receiving lens, said light-receiving element generating an output corresponding to a distance to said subject, wherein the distance to the subject is detected on the basis of the output from said light-receiving element,
   said light-receiving element having a plurality of pairs of terminals, the terminals of each pair being separate and distinct from the terminals of an adjacent pair, each pair being offset from an adjacent pair by a predetermined interval in a lengthwise direction of a light-receiving region of said light-receiving element and defining light-receiving regions therebetween, the terminals of each pair being separated from each other by a predetermined distance which is the same for each pair of terminals,
   detecting means for detecting a difference in alignment between an optical axis of said light-receiving lens and an optical center of said light-receiving element corresponding to said output generated from a predetermined pair of said terminals of said light-receiving element, and for producing an output in response thereto, and
   selecting means for selecting a desired pair of said terminals which minimizes the difference in the alignment between the optical axis of said light receiving lens and the optical center of said light-receiving element according to the output from said detecting means.

2. A distance measuring device according to claim 1, wherein said light-receiving element is a PSD (semiconductor position sensor diode).

3. A distance measuring device according to claim 1, wherein said detecting means includes means for projecting light toward a subject located at a known predetermined distance from said distance measuring device and for detecting the difference in the alignment between the optical axis of said light-receiving lens and the optical center of said light-receiving element according to an output generated from a predetermined pair of terminals of said light-receiving element on condition that said light-receiving element receives the light reflected by said subject located at the known predetermined distance from said distance measuring device from the light-receiving lens.

4. A distance measuring device comprising:
   a light-projecting unit for projecting light toward a subject,
   a light-receiving lens for receiving reflected light from said subject,
   a light-receiving element positioned to receive the reflected light from the light-receiving lens, said light-receiving element generating an output corresponding to a distance to said subject,
   said light-receiving element having a plurality of pairs of terminals, the terminals of each pair being separate and distinct from the terminals of an adjacent pair, each pair being offset from an adjacent pair by a predetermined interval in a lengthwise direction of a light-receiving region of said light-receiving element and defining light-receiving regions therebetween, the terminals of each pair being separated from each other by a predetermined distance which is the same for each pair of terminals,
   detecting means for detecting a difference in alignment between an optical axis of said light-receiving lens and optical center of said light-receiving element corresponding to an output generated from a predetermined pair of said terminals of said light-receiving element when said light-receiving element receives light reflected by a subject located at a known predetermined distance from said distance measuring device, and for producing an output in response thereto,
   selecting means for selecting a desired pair of said terminals which minimizes the difference in the alignment between the optical axis of said light-receiving lens and the optical center of said light-receiving element according to the output from said detecting means,
   thereby detecting the distance to a subject located at an unknown distance from said distance measuring device on the basis of the output from said selected pair of terminals of said light-receiving element.

5. A distance measuring device according to claim 4, wherein said light-receiving element is a PSD (semiconductor position sensor diode).

6. A distance-measuring device comprising:
   a light-projecting unit for projecting light toward a subject,
   a light-receiving lens for receiving reflected light from said subject,
   a light-receiving element positioned to receive the reflected light from the light-receiving lens, said light-receiving element generating an output corresponding to a distance to said subject, wherein the distance to the subject is detected on the basis of the output from said light-receiving element,
   said light-receiving element having a plurality of pairs of terminals at predetermined intervals in a lengthwise direction of a light-receiving region thereof and defining light-receiving regions therebetween, with a different optical center being defined for each of said light receiving regions,
   selecting means for selecting a desired pair of said terminals that defines a desired light-receiving region which minimizes a difference in alignment between an optical axis of said light-receiving lens and an optical center of the desired light-receiving region among said light-receiving regions, and detecting means for detecting the distance to the subject according to an output from said desired pair of terminals.

7. A distance-measuring device according to claim 6, wherein said selecting means includes means for:

projecting light toward a subject located at a known predetermined distance from said distance measuring device, detecting a distance to said subject according to an output generated from a predetermined pair of terminals which defines a predetermined light-receiving region of said light receiving element on condition that said predetermined light-receiving region of said light-receiving element receives the light reflected by said subject located at the known predetermined distance from said distance measuring device from the light-receiving lens, and selecting said desired pair of terminals that defines said desired light-receiving region which minimizes the difference in the alignment between the optical axis of said light-receiving lens and an optical center of the desired light-receiving region among said light-receiving regions according to an output from said predetermined pair of terminals.

8. A distance-measuring device comprising:

a light-projecting unit for projecting light toward a subject, a light-receiving lens for receiving reflected light from said subject, a light-receiving element positioned to receive the reflected light from the light-receiving lens, said light-receiving element generating an output corresponding to a distance to said subject, wherein the distance to the subject is detected on the basis of the output from said light-receiving element, said light-receiving element having a plurality of pairs of terminals at predetermined intervals in a lengthwise direction of a light-receiving region thereof and defining light-receiving regions therebetween, with a different optical center being defined for each of said light receiving regions, selecting means for selecting a desired pair of said terminals that defines a desired light-receiving region which minimizes a difference in alignment between the optical axis of said light-receiving lens and an optical center of the desired light-receiving region among said light-receiving regions, detecting means for detecting the distance to the subject according to an output from said desired pair of terminals and for generating distance data corresponding to the detected distance, memory means for storing output deviation data which indicates a difference between an output of said detecting means on the basis of said output generated from said desired pair of terminals and reference output data, and said detecting means includes means for adjusting measuring data generated from the output of said desired pair of terminals on the basis of said output deviation data and for generating the adjusted measuring data as said distance data.

9. A distance-measuring device according to claim 8, wherein said selecting means includes means for:

projecting light toward said subject located at said known predetermined distance from said distance measuring device, detecting a distance to said subject according to an output generated from a predetermined pair of terminals which defines a predetermined light-receiving region of said light receiving element on condition that said predetermined light-receiving region of said light-receiving element receives the light reflected by said subject located at the known predetermined distance from said distance measuring device from the light-receiving lens, and selecting said desired pair of terminals that defines said desired light-receiving region which minimizes the difference in the alignment between the optical axis of said light-receiving lens and an optical center of the desired light-receiving region among said light-receiving regions according to an output from said predetermined pair of terminals.

10. A method of measuring a distance to a subject, comprising the steps of:

(a) projecting light toward a subject located at a known predetermined distance from a light-projecting unit for projecting said light, (b) receiving reflected light from said subject from a light-receiving lens by a predetermined light-receiving region of a light receiving element which has a plurality of pairs of terminals at predetermined intervals in a lengthwise direction of a light-receiving region thereof and which defines light-receiving regions therebetween, with a different optical center for each of said light receiving regions, said predetermined light-receiving region being defined by a predetermined pair of terminals, (c) selecting a desired pair of terminals that defines a desired light-receiving region which minimizes a difference in alignment between an optical axis of said light-receiving lens and the optical center of said desired light-receiving region among said light-receiving regions according to an output from said predetermined pair of terminals, and (d) detecting a distance to a subject according to an output from said desired pair of terminals.

11. A method of measuring a distance to a subject, comprising the steps of:

(a) projecting light toward a subject located at a known predetermined distance from a light-projecting unit for projecting said light, (b) receiving reflected light from said subject from a light-receiving lens by a predetermined light-receiving region of a light receiving element which has a plurality of pairs of terminals at predetermined intervals in a lengthwise direction of a light-receiving region thereof and which defines light-receiving regions therebetween, with a different optical center for each of said light receiving regions, said predetermined light-receiving region being defined by a predetermined pair of terminals, (c) selecting a desired pair of terminals that defines a desired light-receiving region which minimizes a difference in alignment between an optical axis of said light-receiving lens and the optical center of said desired light-receiving region among said light-receiving regions according to an output from said predetermined pair of terminals, (d) calculating output deviation data which indicates a difference between said output generated from said desired pair of terminals and reference data, (e) adjusting measuring data on the basis of an output from said desired pair of terminals according to said output deviation data, and (f) detecting a distance to a subject according to an output from said adjusted measuring data.

12. A method of selecting terminals of a light-receiving element in a camera, comprising the steps of:

(a) projecting light toward a subject located at a known predetermined distance from a light-projecting unit for projecting said light, (b) receiving reflected light from said subject from a light-receiving lens by a predetermined light-receiving region of a light receiving element which has a plurality of pairs of terminals at predetermined intervals in a lengthwise direction of a light-receiving region thereof and which defines light-receiving regions therebetween and which defines a different optical center of each of said light receiving regions, said predetermined light-receiving region being defined by a predetermined pair of terminals, and (c) selecting a desired pair of terminals that defines a desired light-receiving region which minimizes a difference in alignment between an optical axis of said light-receiving lens and the optical center of said desired light-receiving region among said light-receiving regions according to an output from said predetermined pair of terminals.

* * * * *